March 4, 1947. W. W. SIMMONDS 2,417,021
POWER-LIFT ATTACHMENT FOR TRACTORS
Filed March 17, 1945 3 Sheets-Sheet 1

INVENTOR:
W. W. Simmonds
BY
Chas. O. Genard
ATTORNEY.

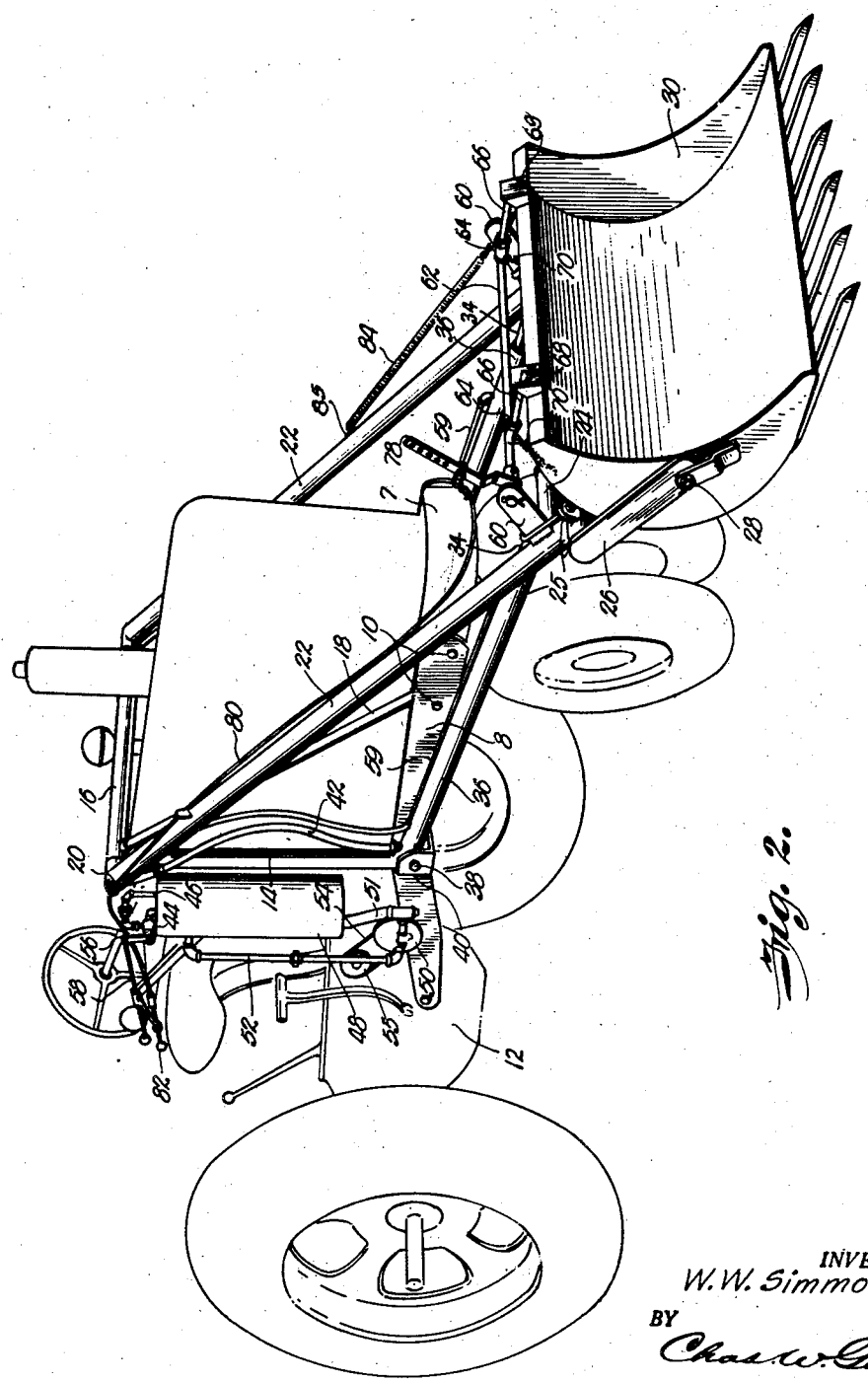

March 4, 1947.  W. W. SIMMONDS  2,417,021
POWER-LIFT ATTACHMENT FOR TRACTORS
Filed March 17, 1945  3 Sheets-Sheet 3
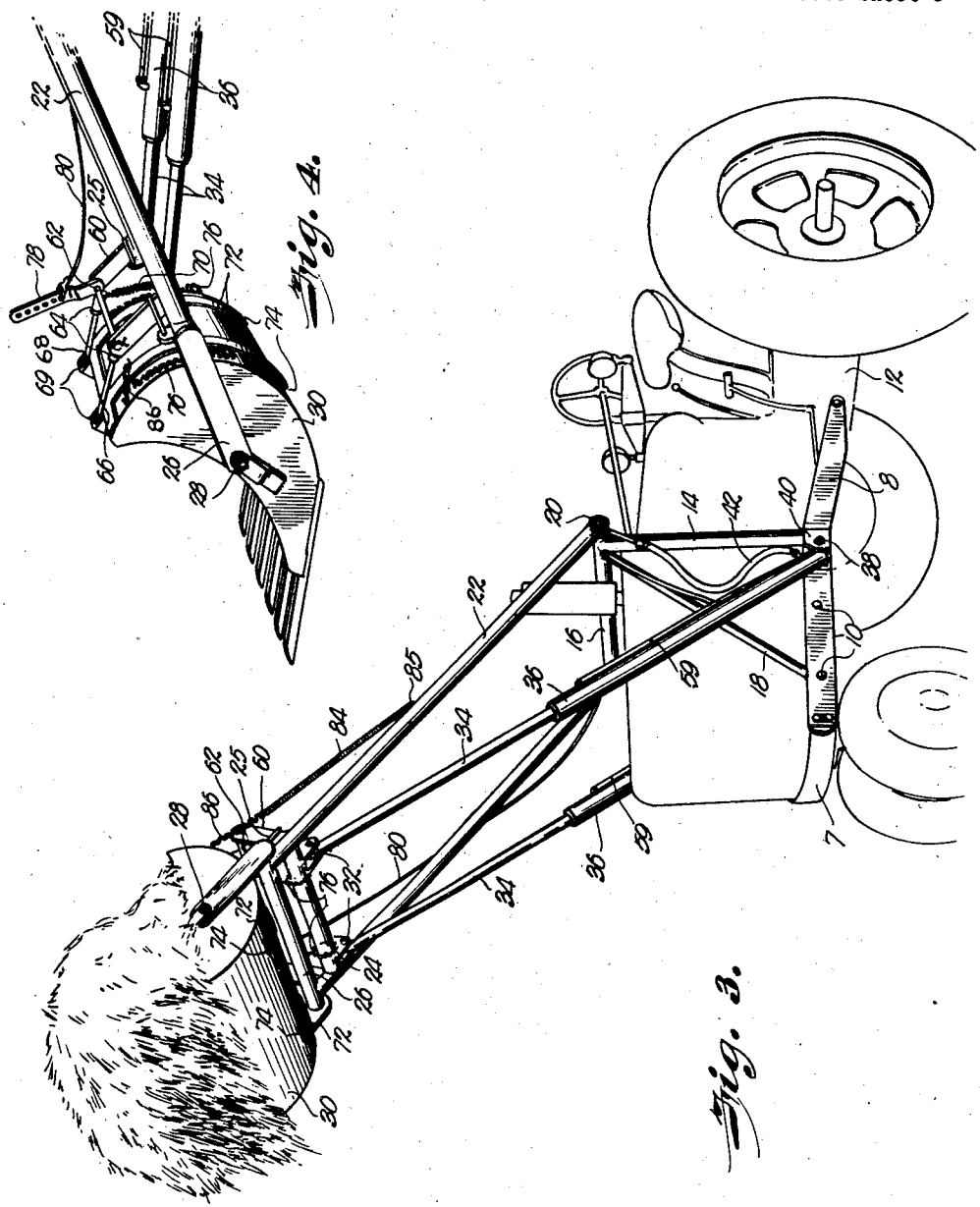
INVENTOR:
W. W. Simmonds,
BY
*Chas. W. Gerard*
ATTORNEY.

Patented Mar. 4, 1947

2,417,021

UNITED STATES PATENT OFFICE 2,417,021

POWER-LIFT ATTACHMENT FOR TRACTORS

Wayne W. Simmonds, Ottawa, Kans., assignor to Ottawa Steel Products, Incorporated, Ottawa, Kans., a corporation of Kansas Application March 17, 1945, Serial No. 583,300

4 Claims. (Cl. 214—140)

The present invention relates to power lifting apparatus, such as power shovels, power loaders and the like, and aims to provide improved and more efficient apparatus of this character which is suitable for operation in connection with farm tractor equipment.

A primary object of the invention is to provide a construction requiring practically a minimum amount of framework or structural elements for the mounting of the operative parts in power-lifting relation to a tractor unit, as well as in their most efficient and rigidly supported relation thereto.

Accordingly I have devised an improved construction which comprises supporting frame pieces adapted for ready attachment to the opposite sides of a tractor body and serving as a mounting for power-lift arms as well as hydraulic operating means, which are operatively connected with load-carrying means supported for lifting movement at one end of the tractor.

More specifically, the invention comprises frame members applicable to opposite sides of the tractor and extending substantially the full length of the tractor body and adapted to support power-lifting arms and hydraulic operating means for swinging operative movement about axes at different heights, and the outer ends of the lifting arms being pivotally connected with said hydraulic operating means and also to load-carrying means at the same end of the tractor.

It is a further object of the invention to provide apparatus of the character described having means for automatically latching the shovel or other load-carrying means temporarily while in dumping position, and thereafter to automatically return the shovel (after release of said latching means) to its original position and also relatch the same for reloading purposes.

With the foregoing general objects in view, as well as minor objects as will appear in the course of the detail specification, the invention will now be described by reference to the accompanying drawings illustrating one form of construction which has been found practical for the satisfactory embodiment of the proposed improvements, after which those features and combinations deemed to be novel and patentable will be particularly set forth and claimed.

In the drawings—

Figure 2 is a similar view looking in a different direction, and showing the shovel member in lowered position, for loading;

Figure 3 is also a perspective view of the attachment as applied to a tractor unit, and illustrating the hydraulic mechanism as having operated to elevate the shovel unit into its maximum raised position; and Figure 4 is a rear perspective view of the shovel member and its connections.

Figure 1:
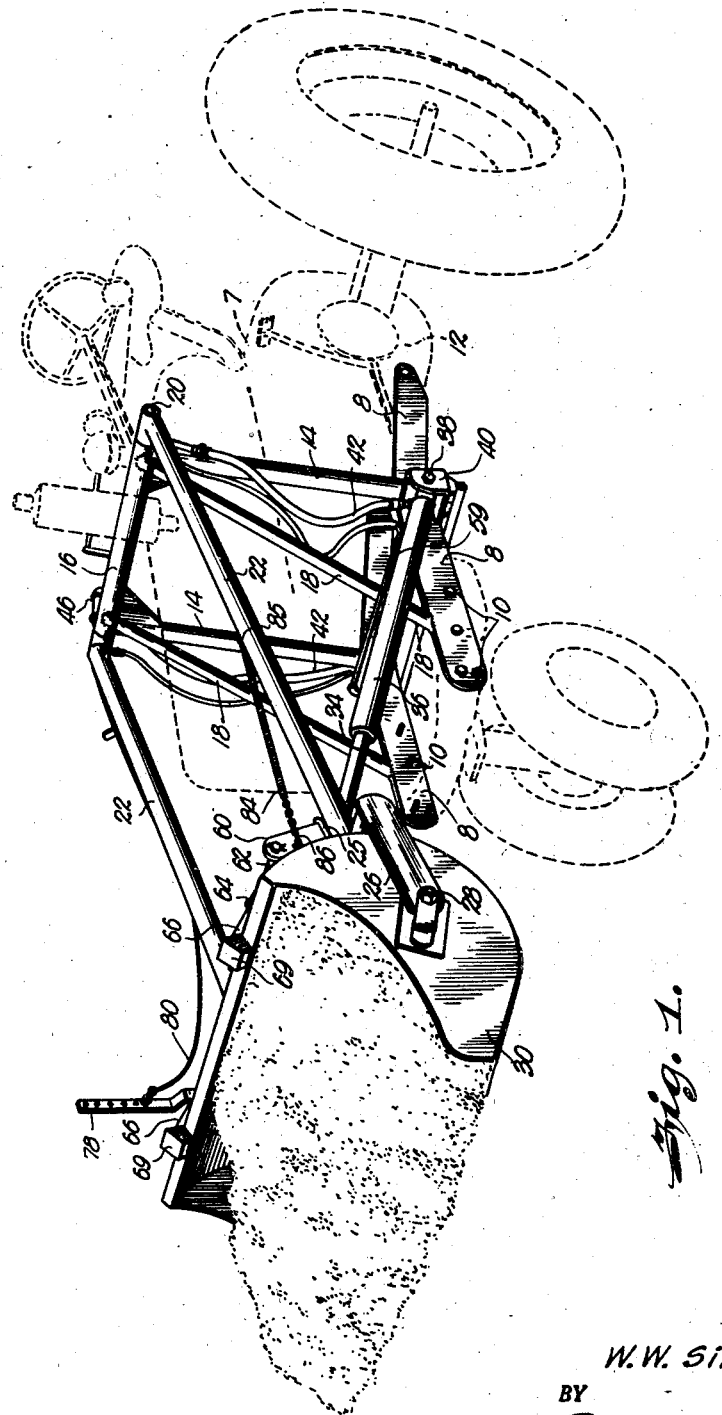
Figure 1 is a perspective view of a power loader attachment embodying the present invention, with a tractor unit indicated in dotted lines in its relation to said attachment.

Referring now to the said drawings in detail, the improvements are illustrated therein as assembled in operative relation to a conventional form of farm tractor by being attached thereto through the medium of side plates or frame pieces secured to the chassis frame or body portion 7 of the tractor. The supporting framework for thus mounting the equipment upon the tractor comprises a pair of heavy frame plates 8 suitably drilled with bolt openings for attachment by means of bolts or screws 10 to the sides of the framework 7 of the tractor; and, as shown, these side plates 8 are of such length as to extend from the front end of the tractor almost to the rear end thereof, or in position for engagement with the rear axle housing 12 of the tractor—thus affording a firm and most rigid supporting structure as well as an efficient bracing means against endwise thrust as transmitted by the action of the power-lifting means, in the working operation of the apparatus.

To the midportions of the plates 8 are rigidly secured the lower ends of a pair of upright posts 14, the upper ends of which are also rigidly connected by a cross member 16 projecting over and across the top of the tractor unit. The stationary posts 14 are further supported and braced by means of diagonally extending brace members 18 rigidly connecting the end portions of said cross member 16 with the side plates 8 near the front end of the latter.

The ends of the cross member 16 provide trunnions 20 for fulcruming the rear ends of a pair of load-lifting arms 22, the front ends of which are rigidly connected by a cross member 24. To the extreme ends of said arms 22 is attached (as indicated at 25) a bail or yoke member 26 having pivotal connections (as at 28) with the opposite sides of the scoop or shovel or other form of material-carrying device 30.

The end portions of the cross member 24 are also pivotally connected (as indicated at 32) to the ends of a pair of plungers 34 which operate in telescoping relation to a pair of hydraulic cylinders 36, the rear ends of which are fulcrumed, as at 38, in brackets 40 rigidly secured to the sides of the plates 8 at the lower ends of the stationary posts 14. The said rear ends of the hydraulic cylinders 36 are provided with fluid-pressure hose or pipe connections 42 to a control valve 44 from which a pipe connection 46 leads to an oil tank or reservoir 48. A conventional type of pumping unit 50 is provided with appropriate connections 51 and 52 to said tank and valve respectively, and also with a suitable drive connection 54 to a drive pulley 55 which is adapted to be actuated from the engine in a manner common to apparatus of this type.

The control valve 44 is provided with an operating lever 56 connecting with a control rod 58 extending in position for manual operation and control by the driver, as illustrated in Figure 2.

Each of the hydraulic cylinders 36 is also provided with an oil conducting tube 59 designed for the return of any excess oil finding its way to the outer ends of said cylinders.

On the front ends of the load-lifting arms 22 are mounted brackets 60 for the purpose of fulcruming a rocker shaft 62 which is provided with a pair of socket elements 64 for adjustably mounting a pair of latch arms 66 having hook-ends 68 which are adapted for projecting within keepers 69 into latching engagement with the upper rear edge of the shovel member 30 as represented in Figure 4. These latch arms are actuated by suitable springs 70 for maintaining said hook-ends in their latching engagement with the shovel, whereas in the swinging movement of the shovel the said hook-ends ride over suitable wear strips 72 attached to the bottom face of the shovel and into engagement with shoulders or stops 74 at the ends of said strips, whereby the shovel is again automatically latched while in its dumping position. Flexible chain elements 76, attached at their opposite ends to the bottom face of the shovel and to the cross member 24 respectively, serve to limit said swinging movement of the shovel into its discharge or dumping position.

The rocker shaft 62 is also provided with an arm 78 to which is attached a flexible operating connection 80 leading back to the rear of the apparatus where it is attached to an operating rod 82 convenient to the driver's position, whereby the hook elements 68 may at any time be readily released from latching engagement with the shovel.

One of the load-lifting arms 22 is provided with a strong spring 84 secured to said arm at one end as indicated at 85, and having its opposite end attached to the bottom of the shovel by means of a short length of chain 86 whereby it may be adjusted for varying the spring action, which is adapted to be sufficient to reverse the swinging movement of the shovel, after dumping, for swinging it back into its original latched position.

In the operation of the apparatus, the load-lifting arms 22 are initially in lowered position, as represented in Figure 2, and the shovel member 30 is latched in loading position by means of the latching devices 66—68.

After the shovel has been loaded with the material being handled, the driver by operation of the valve rod 58 admits the hydraulic operating fluid to the cylinders 36, whereby the plungers 34 are actuated in a direction to lift the arms 22 into any desired elevated position, as determined by the operation of said valve rod 58. On reaching the desired dumping elevation, the driver releases the shovel from the latches 66 by operation of the control member 82, whereupon the shovel automatically rocks into dumping position and is again latched in its maximum dumping position by the engagement of the hook elements 68 with the stops or shoulders 74. This position of the shovel places the spring 84 under a degree of tension sufficient, after the latch arms 66 are again operated (by means of said control member 82) to disengage the stops 74, to automatically return the shovel back into its original loading position, where it is once more automatically relatched by said latching means, as hereinbefore explained.

The return movement of the shovel into its original lowered position is of course brought about by the control of the valve for releasing the hydraulic fluid from the cylinders 36, thereby allowing all the movable or operating parts to simply settle by gravity back into lowered or loading position, as illustrated in Figure 2.

It will therefore be apparent from the foregoing that I have devised a simple and practical and yet extremely efficient apparatus having a construction adapted for carrying out all the desired objects of my invention. The side plates are designed to have the bolt openings drilled to a pattern enabling the framework to be readily and quickly applied to the tractor (or removed therefrom) with a minimum of labor and without any change or modification of any sort in the construction of the tractor itself. Moreover the framework is of a character well designed to provide maximum strength for the support of all operating parts, and the arrangement of the hydraulic cylinders is such as to operate with a horizontal thrust, which is transmitted for the most part in a horizontal direction; and since the supporting frame pieces are extended rearwardly as far as possible, this operating thrust is taken up and absorbed in the direction of the main lines of strength of the apparatus; and again, this arrangement is reinforced by virtue of the rear ends of said side plates being extended into abutting relation with the rear axle housing of the tractor, as above explained.

The framework of the tractor itself is practically relieved of any material torsional strain by the improved design and rigidity of the supporting framework comprising the accessory appliances, thus insuring that no excessive strain or damage is imposed upon the tractor equipment.

It is also pointed out that the framework of the apparatus is such as to require a minimum of head room, so that the range of movement of the tractor is in no way limited by the accessory equipment carried thereby so long as the power-lift is not operated to any heights above the top of the tractor.

While I have herein illustrated and described what I now regard as the preferred form of construction for the embodiment of my proposed improvements, I nevertheless desire to be understood as reserving the right to make whatever changes or modifications may fairly be deemed to fall within the spirit and scope of my invention as defined by the appended claims.

Having thus described my invention, what I claim and desire to secure by Letters Patent is:

1. A power lift attachment for tractors comprising, a frame including vertical members, means for attaching the frame to opposite sides of the tractor frame, the lower end of the vertical members extending to substantially the bottom of the tractor frame, trunnions extending outwardly from the upper ends of the vertical members, load lifting arms having their rear ends pivotally mounted on said trunnions, a cross member rigidly connecting the load lifting arms adjacent the forward ends thereof, material carrying means pivotally carried by the outer ends of the arms, hydraulic cylinders pivoted adjacent the lower ends of the vertical members and provided with plunger rods projecting forwardly to the front of the tractor, means for pivotally connecting the forward ends of said plungers to the cross member intermediate the load lifting arms, and valve-controlled hydraulic connections adjacent the pivoted ends of said hydraulic cylinders for applying fluid pressure thereto for actuating the plungers and lifting the material carrying means.

2. A power lift attachment for tractors comprising, a frame including spaced vertical members, means for attaching the vertical members to opposite sides of the tractor frame, the lower end of the vertical members extending to substantially the bottom of the tractor frame, trunnions extending outwardly from the upper ends of the vertical members, load lifting arms having their rear ends pivotally mounted on said trunnions, a cross member rigidly connecting the load lifting arms adjacent the forward ends thereof, a yoke member rigidly secured to the forward ends of the arms, material carrying means pivotally connected to said yoke member, hydraulic cylinders pivoted adjacent to and in alignment with the lower ends of the vertical members and provided with plunger rods projecting forwardly to the front of the tractor, means for pivotally connecting the forward ends of said plungers to the cross member intermediate the load lifting arms, and valve-controlled hydraulic connections adjacent the pivoted ends of said hydraulic cylinders for applying fluid pressure thereto for actuating the plungers and lifting the material carrying means.

3. A power lift attachment for tractors comprising, spaced horizontal members adapted to be attached to the sides of a tractor frame, vertical members secured to the outer side of the horizontal members and extending upwardly above the tractor, means extending over the tractor rigidly connecting the upper ends of the vertical members, bracing means having one end rigidly connected with the vertical member connecting means and having the opposite end connected to the horizontal members in spaced relation to and forwardly of the vertical members, trunnions extending outwardly from the upper ends of the vertical members, load lifting arms having their rear ends pivotally mounted on said trunnions, a cross member rigidly connecting the load lifting arms adjacent the forward ends thereof, material carrying means pivotally carried by the outer ends of the arms, hydraulic cylinders pivoted adjacent to and in alignment with the lower ends of the vertical members and provided with plunger rods projecting forwardly to the front of the tractor, means for pivotally connecting the forward ends of said plungers to the cross member intermediate the load lifting arms, and valve-controlled hydraulic connections adjacent the pivoted ends of said hydraulic cylinders for applying fluid pressure thereto for actuating the plungers and lifting the material carrying means.

4. A power lift attachment for tractors comprising, spaced horizontal members adapted to be attached to the sides of a tractor frame, vertical members secured to the outer side of the horizontal members and extending upwardly above the tractor, means extending over the tractor rigidly connecting the upper ends of the vertical members and forming a U-shaped frame therewith, bracing means having ends connected with the upper portion of the U-shaped frame and having the opposite ends connected to the horizontal members in spaced relation to and forwardly of the vertical members, trunnions extending outwardly from the upper ends of the vertical members, load lifting arms having their rear ends pivotally mounted on said trunnions, a cross member rigidly connecting the load lifting arms adjacent the forward ends thereof, material carrying means pivotally carried by the outer ends of the arms, hydraulic cylinders pivoted adjacent the lower ends of the vertical members and provided with plunger rods projecting forwardly to the front of the tractor, means for pivotally connecting the forward ends of said plungers adjacent to the forward ends of the load lifting arms, and valve-controlled hydraulic connections adjacent the pivoted ends of said hydraulic cylinders for applying fluid pressure thereto for actuating the plungers and lifting the material carrying means.

WAYNE W. SIMMONDS.

REFERENCES CITED

The following references are of record in the file of this patent:

UNITED STATES PATENTS

| Number | Name | Date |
|---|---|---|
| 1,321,983 | Cole | Nov. 18, 1919 |
| 2,001,803 | Stephens | May 21, 1935 |
| 2,268,689 | Andrus | Jan. 6, 1942 |
| 2,295,917 | Schwan | Sept. 15, 1942 |
| 2,296,827 | Andersen et al. | Sept. 29, 1942 |
| 2,319,921 | Dooley et al. | May 25, 1943 |
| 2,348,899 | Guignard et al. | May 16, 1944 |
| 2,349,335 | Baldwin | May 25, 1944 |
| 2,387,656 | Gledhill | Oct. 23, 1945 |
| 2,393,435 | Wachter | Jan. 22, 1946 |
| 2,395,622 | Galbreath | Feb. 26, 1946 |